(12) United States Patent
Yoshida et al.

(10) Patent No.: US 11,300,357 B2
(45) Date of Patent: Apr. 12, 2022

(54) MULTITUBULAR ROTARY HEAT EXCHANGER

(71) Applicant: YOSHINO GYPSUM CO., LTD., Tokyo (JP)

(72) Inventors: Tomonori Yoshida, Tokyo (JP); Takeshi Takenaka, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 53 days.

(21) Appl. No.: 16/981,407

(22) PCT Filed: Mar. 15, 2019

(86) PCT No.: PCT/JP2019/011011
§ 371 (c)(1),
(2) Date: Sep. 16, 2020

(87) PCT Pub. No.: WO2019/193957
PCT Pub. Date: Oct. 10, 2019

(65) Prior Publication Data
US 2021/0048254 A1 Feb. 18, 2021

(30) Foreign Application Priority Data

Apr. 2, 2018 (JP) .............................. JP2018-070578

(51) Int. Cl.
*F28F 9/02* (2006.01)
*F28D 11/04* (2006.01)
(Continued)

(52) U.S. Cl.
CPC .............. *F26B 11/02* (2013.01); *F28D 11/04* (2013.01); *F28F 5/02* (2013.01); *F28F 9/02* (2013.01);
(Continued)

(58) Field of Classification Search
CPC . F28D 11/04; F28F 9/02; F28F 9/0202; F28F 9/0265; F28F 9/0268; F28F 9/0278;
(Continued)

(56) References Cited

U.S. PATENT DOCUMENTS 2,715,517 A * 8/1955 Bojner .................... F28D 11/04
165/88
3,490,754 A * 1/1970 Bauer ...................... F27B 7/00
165/88
(Continued)

FOREIGN PATENT DOCUMENTS

JP 54-62549 5/1979
JP 2603844 1/2000
(Continued)

OTHER PUBLICATIONS

International Search Report dated Jun. 4, 2019 from International Application No. PCT/JP2019/011011, 4 pages.
(Continued)

*Primary Examiner* — Leonard R Leo
(74) *Attorney, Agent, or Firm* — Staas & Halsey LLP

(57) ABSTRACT

A multitubular rotary heat exchanger has a stationary shielding unit. The shielding unit is positioned in close proximity to a tube plate outside a heating or cooling region. A stationary surface of the shielding unit is positioned in opposition to and in close proximity to an end opening of a heat transfer tube moving in an upper zone of the heating or cooling region, thereby transiently reducing or restricting the flow rate of the thermal medium fluid flowing through the heat transfer tube moving in the upper zone.

20 Claims, 9 Drawing Sheets

(51) Int. Cl.
*F28F 5/02* (2006.01)
*C04B 11/00* (2006.01)
*F26B 11/00* (2006.01)
*F26B 11/02* (2006.01)
*C04B 11/028* (2006.01)
*F26B 11/04* (2006.01)

(52) U.S. Cl.
CPC .......... *F28F 9/0202* (2013.01); *F28F 9/0265* (2013.01); *F28F 9/0268* (2013.01); *F28F 9/0278* (2013.01); *C04B 11/007* (2013.01); *C04B 11/0285* (2013.01); *F26B 11/045* (2013.01)

(58) Field of Classification Search
CPC ........ F28F 5/02; F26B 11/045; C04B 11/007; C04B 11/0285
See application file for complete search history.

(56) References Cited

U.S. PATENT DOCUMENTS

| | | | |
|---|---|---|---|
| 3,571,944 A | | 3/1971 | Duhem |
| 3,765,102 A | * | 10/1973 | Fischer ............... F26B 11/0422 34/136 |
| 3,840,334 A | | 10/1974 | Chielens |
| 3,845,941 A | | 11/1974 | Mendenhall |
| 4,000,777 A | | 1/1977 | Laing |
| 4,184,540 A | * | 1/1980 | Myreen ................. F28D 11/04 165/88 |
| 4,863,567 A | * | 9/1989 | Raley ................. B01D 1/0017 165/88 |
| 8,801,816 B2 | | 8/2014 | Okuno et al. |
| 9,683,779 B2 | * | 6/2017 | Kataoka ................ F26B 11/045 |
| 9,897,376 B2 | * | 2/2018 | Nakata ...................... F26B 3/20 |
| 10,371,444 B2 | * | 8/2019 | Nakata ................... F26B 17/32 |
| 10,974,993 B2 | * | 4/2021 | Hayase ................. C04B 11/007 |
| 2019/0016633 A1 | | 1/2019 | Hayase |

FOREIGN PATENT DOCUMENTS

| | | |
|---|---|---|
| JP | 2017-58053 | 3/2017 |
| RU | 2282795 01 | 8/2006 |
| WO | 2017/135250 | 8/2017 |

OTHER PUBLICATIONS

Extended European Search Report dated Dec. 22, 2021 from European Application No. 19780991.6.
Australian Office Action dated Dec. 24, 2021 from Australian Application No. 2019248034.
International Preliminary Report on Patentability dated Oct. 6, 2020 and Translation of Written Opinion of the International Searching Authority dated Jun. 4, 2019 from International Application No. PCT/JP2019/011011.
Russian Decision to Grant dated Apr. 6, 2021 from Russian Application No. 2020135053.
Russian Search Report dated Feb. 25, 2021 from Russian Application No. 2020135053.
Indian Office Action dated May 19, 2021 from Indian Application No. 202037044999.

* cited by examiner

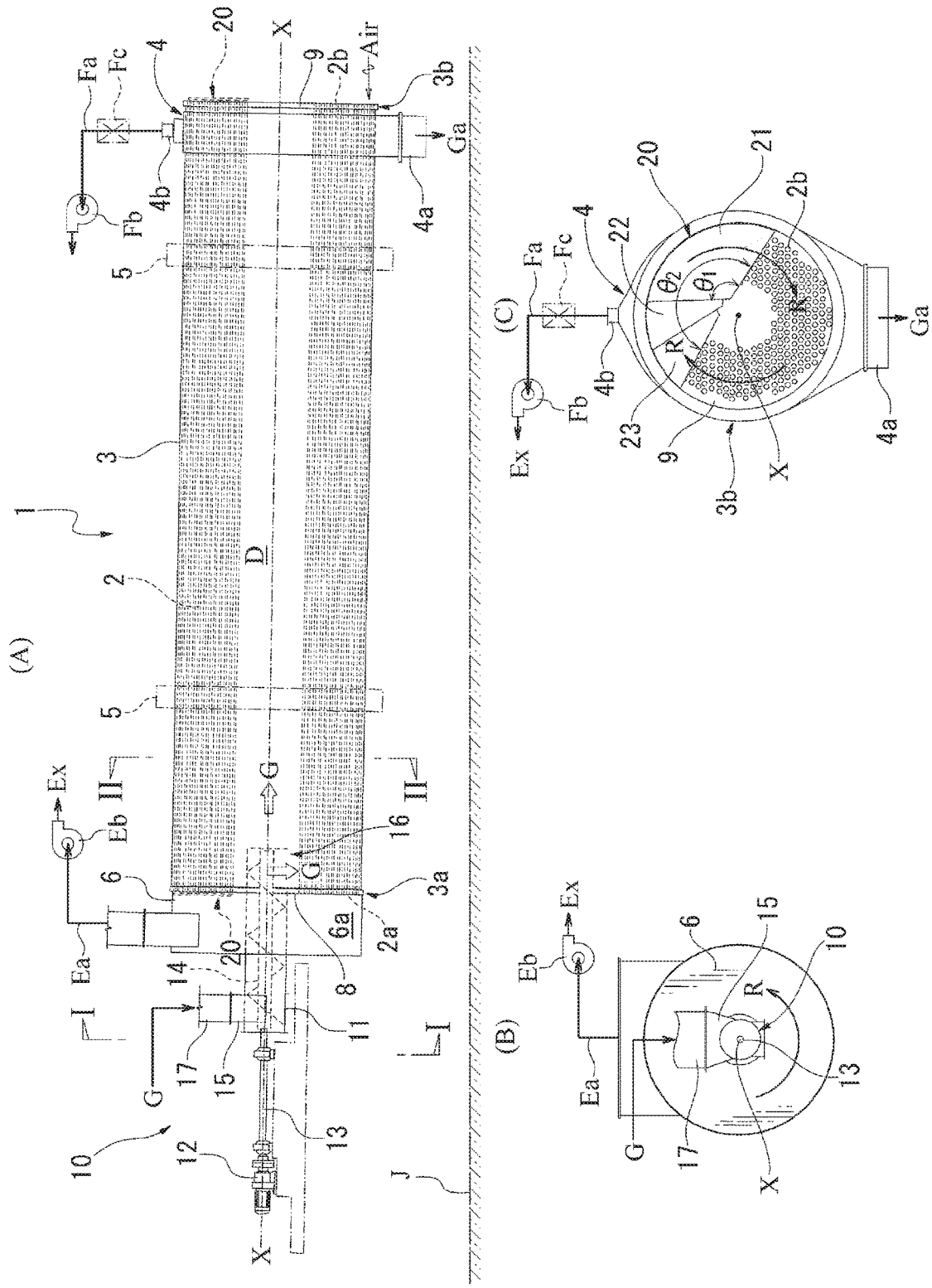
[Fig. 1]

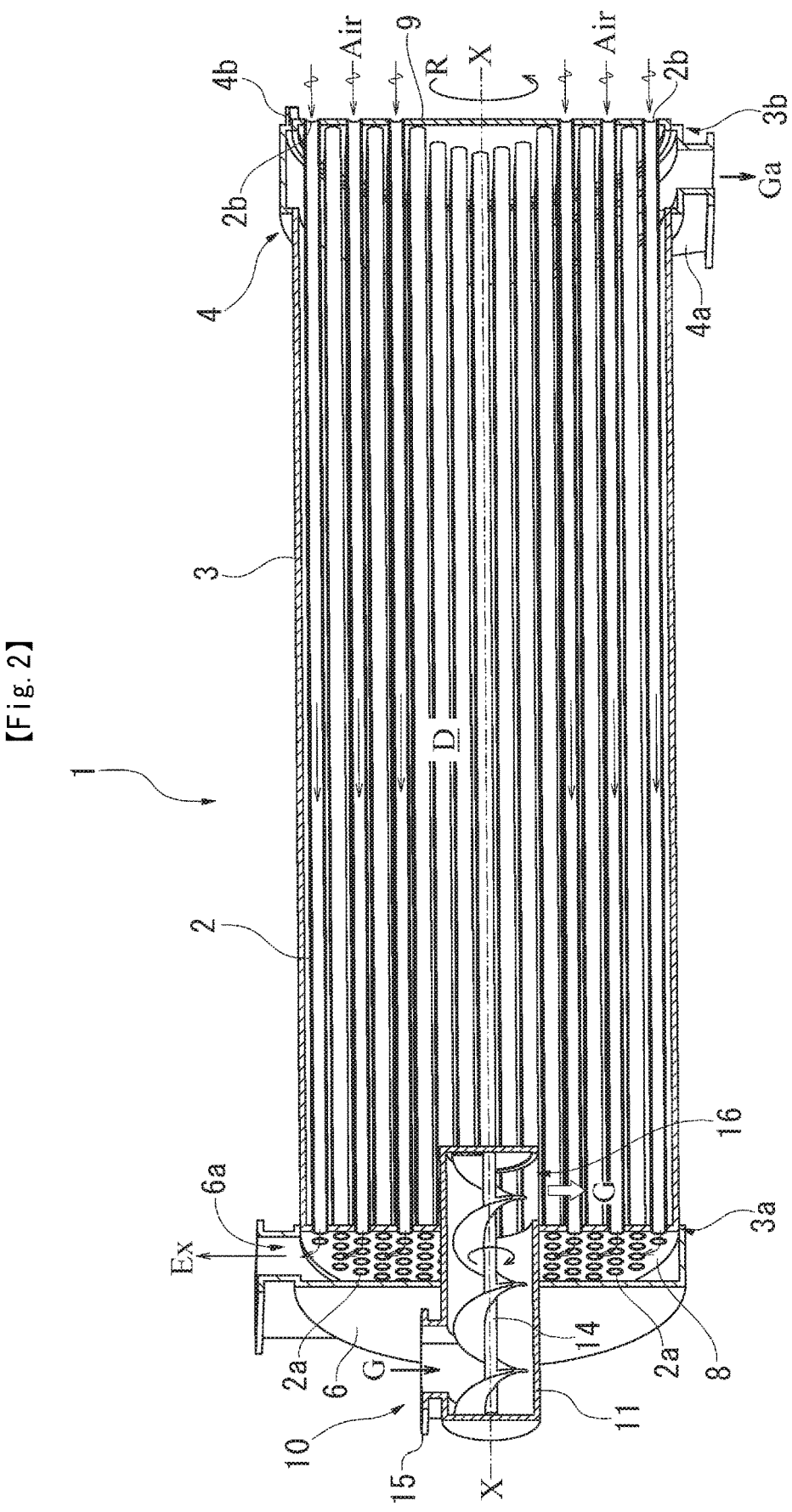
[Fig. 2]

[Fig. 3]
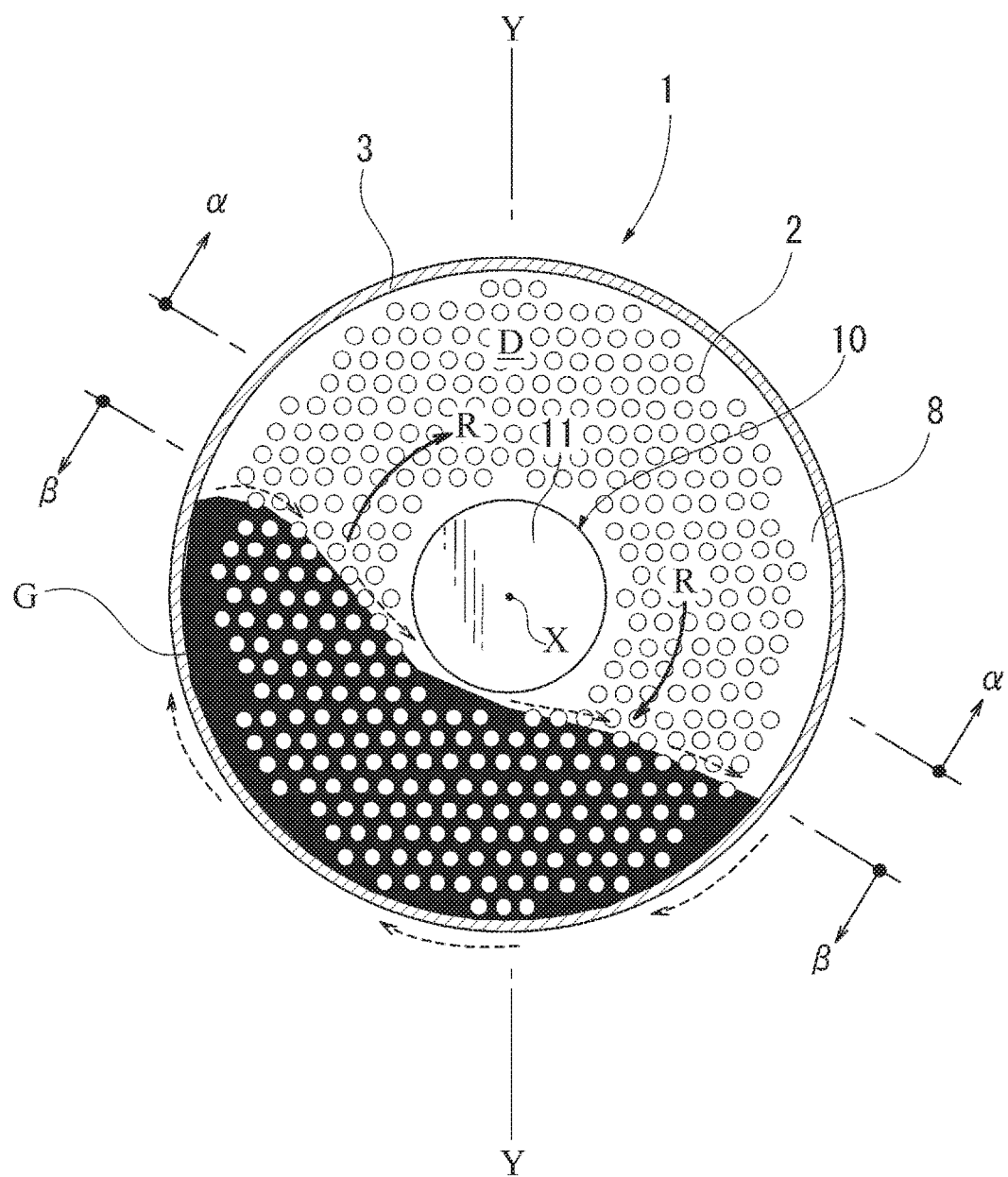

[Fig. 4]
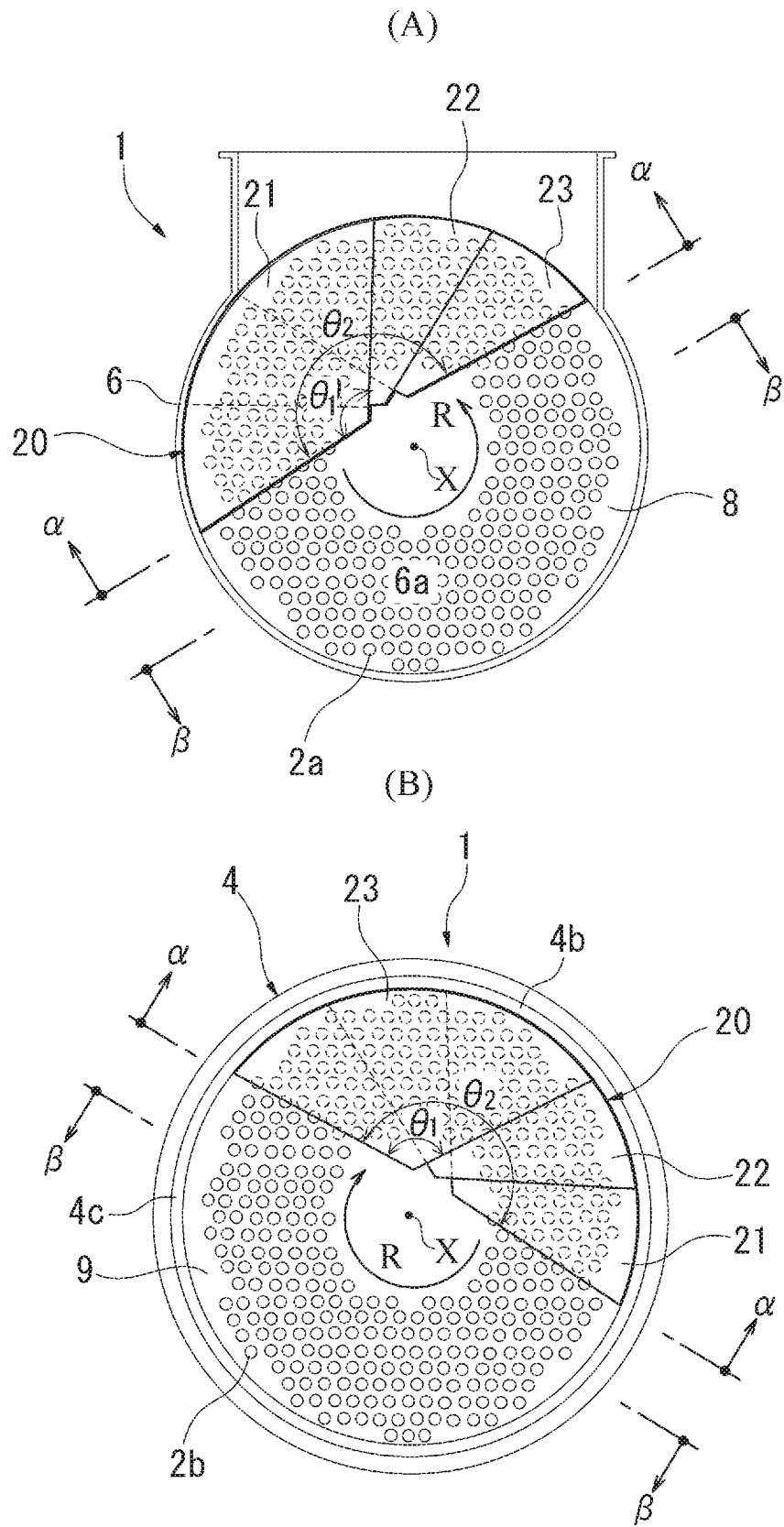

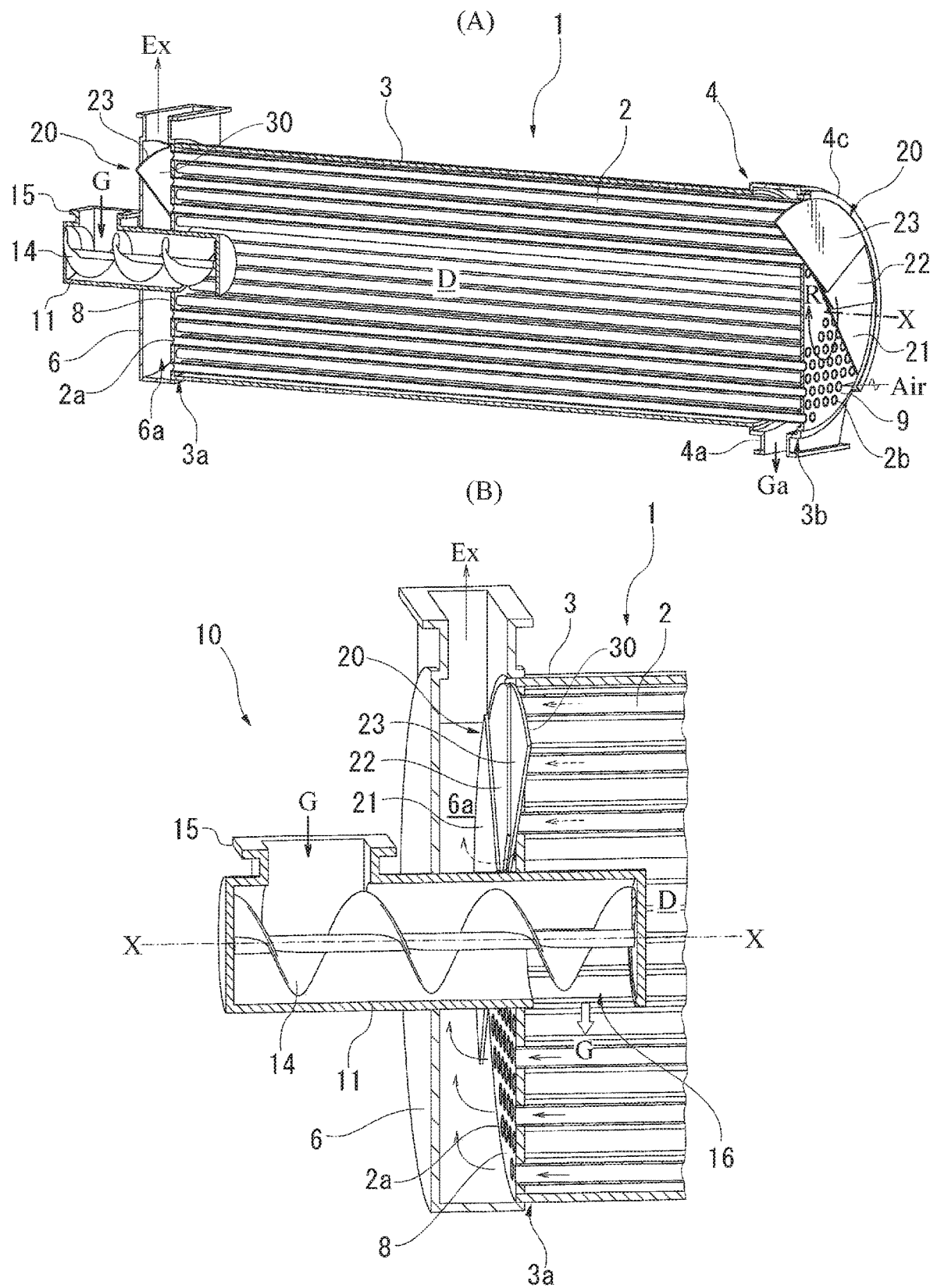
[Fig. 5]

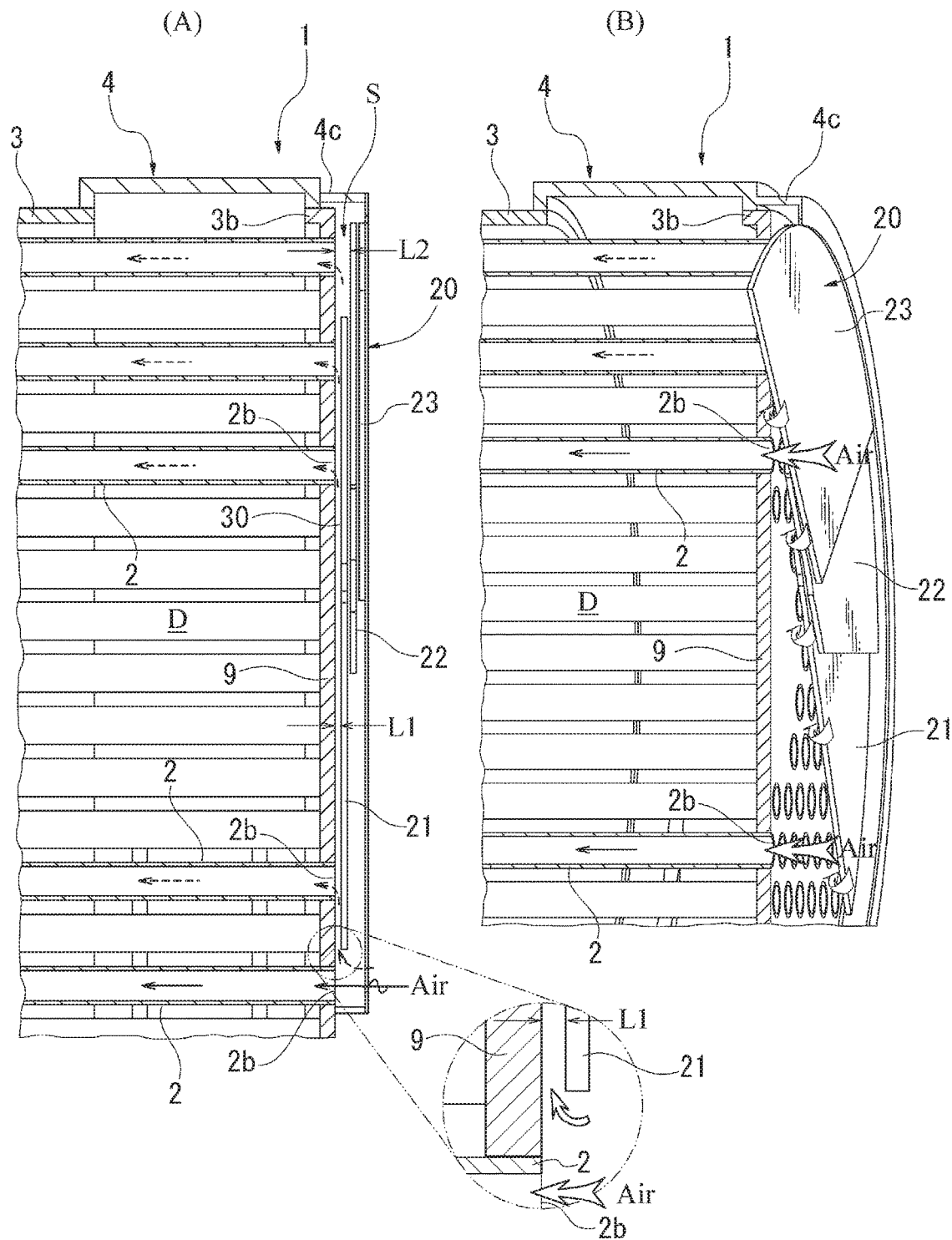
[Fig. 6]

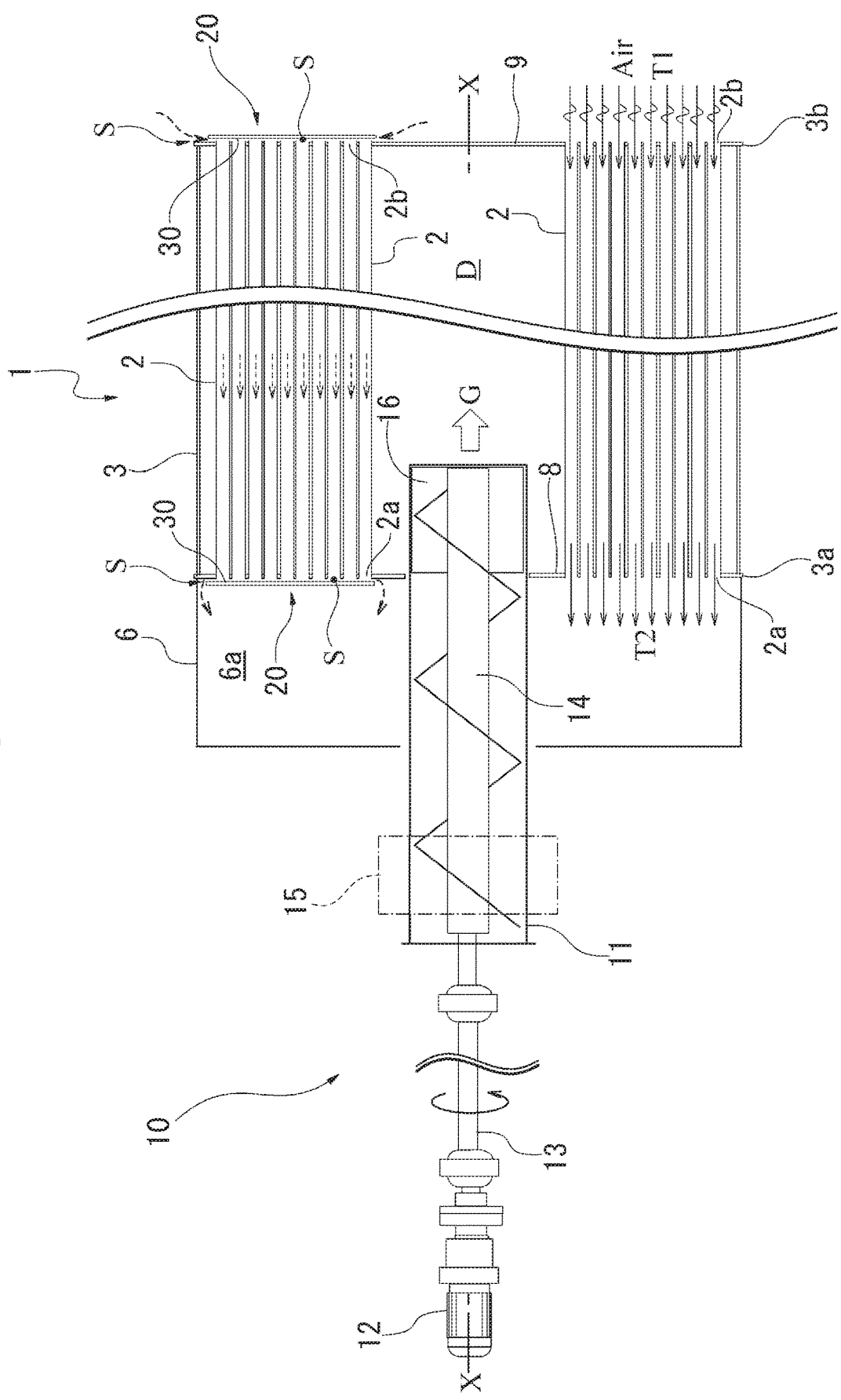
[Fig. 7]

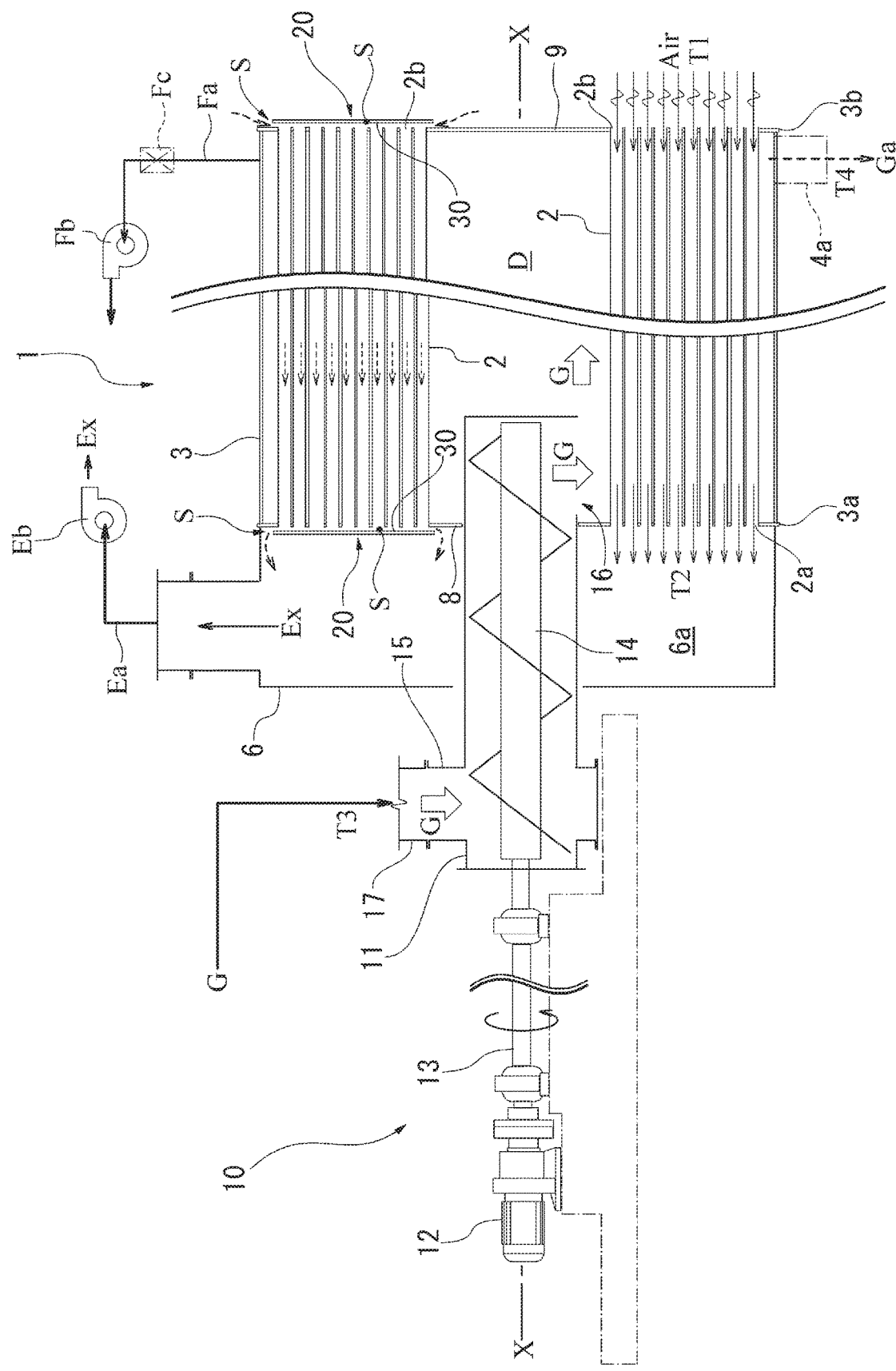
[Fig. 8]

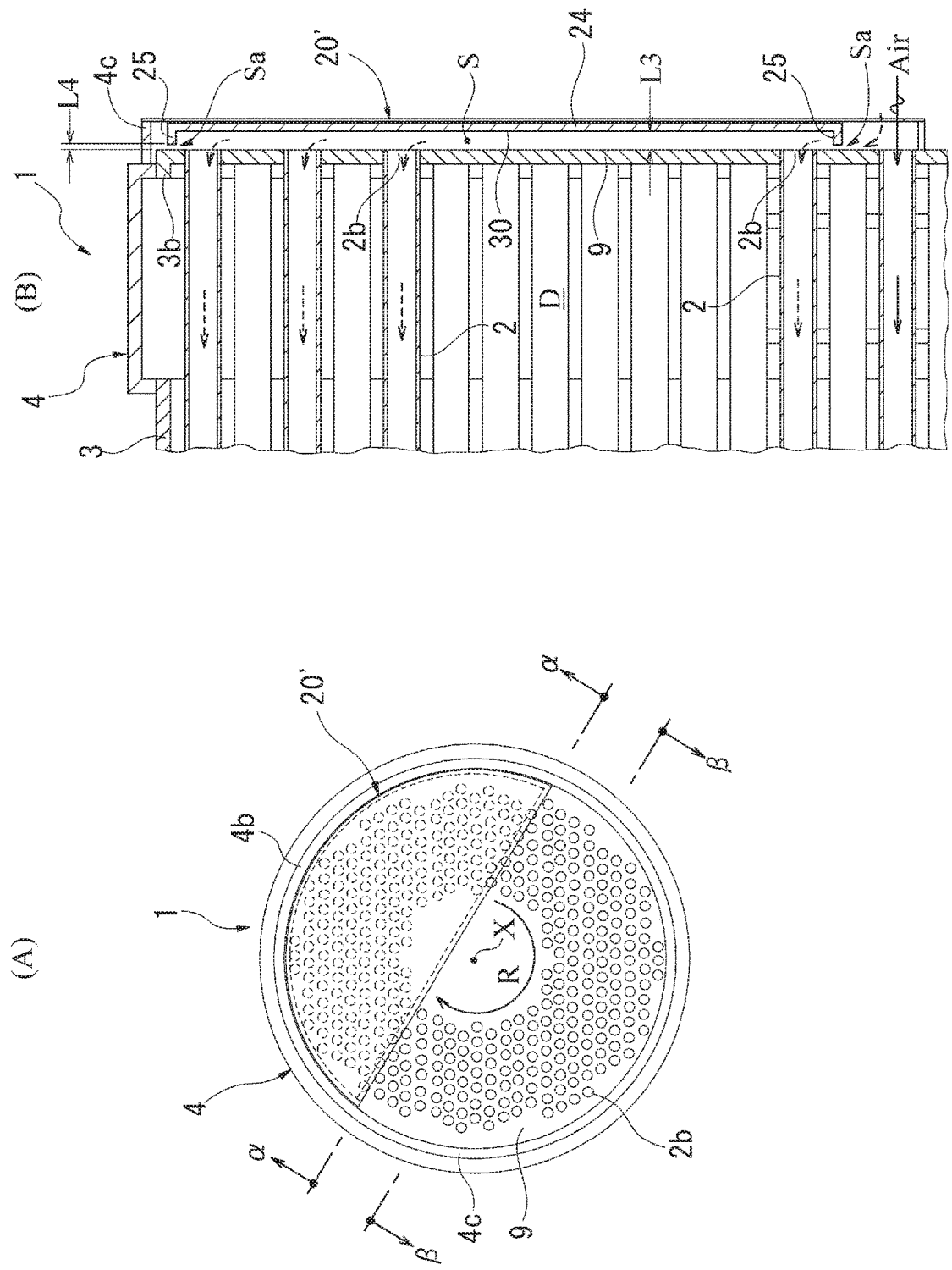
[Fig. 9]

MULTITUBULAR ROTARY HEAT EXCHANGER

CROSS-REFERENCE TO RELATED APPLICATIONS

This application is a U.S. National Stage Application which claims the benefit under 35 U.S.C. § 371 of International Patent Application No. PCT/JP2019/011011 filed on Mar. 15, 2019, which claims foreign priority benefit under 35 U.S.C. § 119 of Japanese Patent Application No. 2018-070578 filed on Apr. 2, 2018, in the Japanese Intellectual Property Office, the contents of all of which are incorporated herein by reference.

TECHNICAL FIELD

The present invention relates to a multitubular rotary heat exchanger, and more specifically, such a heat exchanger which rotates a shell, tube plates, and heat transfer tubes as a whole so that a processed matter in a heating or cooling region of the shell is heated or cooled by heat exchange with a thermal medium fluid in the tubes.

BACKGROUND ART

A multitubular rotary heat exchanger is known in the art, which is arranged to indirectly heat or cool a fluidized solid material or solid matter, such as a powdered or granular material, by a thermal medium fluid in heat transfer tubes. For instance, this type of heat exchanger is described as a multitubular heat exchanger in Japanese Patent Laid-open Publication No. 54-62549 (Patent Literature 1), a multitubular rotary indirect-cooling device in Japanese Utility Model Publication No. 2603844 (Patent Literature 2), a horizontal rotary dryer or STD (Steam Tube Dryer) in Japanese Patent Laid-open Publication No. 2017-58053 (Patent Literature 3), or an inner-tube-rotary type of multitubular cooler in PCT International Publication No. WO2017/135250A1 (Patent Literature 4).

In general, the multitubular rotary heat exchanger comprises a cylindrical shell (shell body), a drum or an outer tube (referred to as "shell" hereinafter) rotationally driven by a rotary drive device; a number of heat transfer tubes installed in the shell in parallel with a center axis of the shell; and tube plates having generally circular profiles, which close both ends of a space in the shell. Each of the tube plates is integrally attached to the shell, and each end portion of the heat transfer tube is carried by the tube plate so that the tube is rotated integrally with the shell and the tube plates. A fluidizable powdered or granular solid material or matter and so forth (referred to as "processed matter" hereinafter) is charged into the inner space of the shell at its end portion located on a processed matter supply side. A center axis of the shell is inclined downward toward an end portion of the inner space on a processed matter discharge side, and therefore, the processed matter is rotationally fluidized in the shell with a rotational movement of the shell, while moving toward the end portion on the processed matter discharge side in correspondence with the inclination of the shell, until the processed matter is discharged out of the shell.

Such a multitubular rotary heat exchanger is provided with an end chamber or end chambers on either one or both ends of the shell. At least one end of each of the heat transfer tubes is open to the chamber. The thermal medium fluid is fed from a supply source of the thermal medium fluid to the chamber on a thermal medium supply side, or the thermal medium fluid (outdoor air) is induced or sucked from an ambient atmosphere. The fluid is introduced into each of the heat transfer tubes to flow though its intratubular fluid passage, and then, the fluid is introduced into the end chamber on a thermal medium fluid discharge side to be exhausted out of the system through the chamber. The processed matter exchanges heat with the thermal medium fluid in the tubes via their tube walls, whereby the processed matter is heated or cooled.

As disclosed in Patent Literature 4, this kind of multitubular rotary heat exchanger can be used as an agitation-type cooler which cools calcined gypsum at a high temperature discharged from a calciner, and so forth.

CITATION LIST

Patent Literatures

[Patent Literature 1] Japanese Patent Laid-open Publication No. 54-62549
[Patent Literature 2] Japanese Utility Model Publication No. 2603844
[Patent Literature 3] Japanese Patent Laid-open Publication No. 2017-58053
[Patent Literature 4] PCT International Publication No. WO2017/135250A1

Summary of Invention

Technical Problem

In general, the processed matter fed to the inner space of the shell of the multitubular rotary heat exchanger merely occupies about one half of the volume of the inner space. The processed matter is fluidized only in a lower zone (processed matter fluidization zone) of the inner space somewhat deviated forward as seen in a rotational direction. Thus, the inner space of the shell includes an upper zone with a relatively large volume where the processed matter to be heat-transferable contact with the heat transfer tubes is absent, and therefore, only the tubes exist. Each of the tubes moves in this upper zone and the processed matter fluidization zone alternately. The thermal medium fluid flows not only through an intratubular fluid passage of the tube moving in the processed matter fluidization zone, but also through the passage of the tube moving in the upper zone equally.

However, most of the thermal medium fluid fed through the tube moving in the upper zone is discharged or exhausted out of the system without taking a heat exchange action with the processed matter. This means that a relatively large amount of the thermal medium fluid is exhausted or discharged through the tubes out of the system without the exchange of the heat with the processed matter. That is, in the conventional multitubular rotary heat exchanger, a relatively large amount of the thermal medium fluid, which cannot be effectively utilized as the thermal medium fluid, is fed through the tubes, and most of the thermal energy of such a fluid is not effectively used, or most of the electric power and so forth for delivery or suction of such a fluid is consumed wastefully. Thus, it is desirable to prevent such degradation of the energy efficiency and the thermal efficiency in the multitubular rotary heat exchanger.

It is an object of the present invention to provide a multitubular rotary heat exchanger capable of restricting or reducing the flow rate of the thermal medium fluid which flows through the heat transfer tube ineffectively cooling or heating the processed matter, thereby improving the energy efficiency or the thermal efficiency, saving the electric power consumption, and so forth.

Solution to Problem

The present invention provides a multitubular rotary heat exchanger having a rotatable shell, tube plates closing both end portions of the shell, and a number of heat transfer tubes disposed in an inner space of the shell, wherein a heating or cooling region for heating or cooling a processed matter introduced into the inner space is formed in the shell, each end portion of each of said tubes is carried by the tube plate, and the end portion of the tube is open on an outside surface of the tube plate or in its vicinity, and wherein the shell, the tube plates, and the tubes are rotated as a whole to heat or cool the processed matter by heat exchange between the thermal medium fluid in the tubes and the processed matter in the heating or cooling region, comprising:

a stationary shielding unit for transiently reducing a flow rate of the thermal medium fluid flowing through said heat transfer tube while the tube moves in an upper zone of said heating or cooling region, wherein said shielding unit is positioned in the vicinity of said tube plate outside said heating or cooling region and is provided with a stationary surface which restricts or limits a flow of said thermal medium fluid induced into the end opening of the tube or the fluid effluent therefrom, and wherein said stationary surface is in close proximity to and in opposition to said end opening of the tube moving in said upper zone and is separated apart from the end opening of the tube moving in a lower zone of said heating or cooling region.

According to the present invention, the stationary surface of the shielding unit prevents the thermal medium fluid from being fluidized in the vicinity of the end opening of the tube during a movement of the tube in the upper zone of the heating and cooling region, thereby reducing or saving the flow rate of the thermal medium fluid flowing through the tube. On the other hand, the end opening of the tube is separated apart or distanced from the stationary surface of the shielding unit during the movement of the tube in contact with the processed matter in the lower zone of the heating or cooling region, and therefore, the flow rate of the thermal medium fluid flowing through the tube is restored to a normal flow rate, whereby the heat exchange action between the thermal medium fluid and the processed matter is ensured. The heat exchanger may be used as a dryer. In general, a phenomenon of "drying" involves a phenomenon of "heating" or "cooling". Therefore, in this specification, the phenomenon of "drying" is deemed to be included in the phenomenon of "heating or cooling".

The thermal medium fluid flows through the intratubular passage of the heat transfer tube under a suction or delivery pressure of a pressurizing or transporting device, such as a fan or blower. A load of the pressurizing or transporting device can be relieved or saved by a reduction in the flow rate of the thermal medium fluid flowing through the tube during its movement in the upper zone. This results in a reduction of a performance or capacity of the pressurizing or transporting device, or a saving of an electric power consumption of the device, and so forth. Further, in a case where air conditioned at a specific temperature, cooled air, heated air, or the like is used as the thermal medium fluid, a volumetric or thermal capacity of the heat source device and so forth can be saved or reduced.

Also, according to the present invention, the flow rate of the thermal medium fluid of the heat transfer tubes, which can not effectively cool or heat the processed matter, is reduced, and therefore, the fluid can be concentrically introduced into the tube which can effectively cool or heat the processed matter. If a total flow rate of the heat exchanger is set to be a value equivalent to a total flow rate of the conventional multitubular rotary heat exchanger arranged to uniformly introduce the fluid into all of the tubes, the flow rate of the fluid through the tube in heat transfer contact with the processed matter is increased in the present invention. Therefore, a heat transfer efficiency of the heat exchanger can be improved in accordance with the present invention. In addition, such an increase of the flow rate of the fluid through the tube enables enlargement of the diameter of the tube (i.e., enlargement of a heat transferable surface area of the tube) for improvement of the heat transfer efficiency of the heat exchanger. This practical advantage is remarkable.

From another aspect, the present invention provides a system for treating calcined gypsum comprising the aforementioned heat exchanger, wherein the heat exchanger is used as an agitation-type cooler for cooling the calcined gypsum, the cooler has a cooling region for cooling the calcined gypsum which functions as the aforementioned heating or cooling region, and the heat transfer tube is open to the atmosphere at its end portion on a thermal medium inflow side, thereby permitting outdoor atmospheric air to flow through the intratubular fluid passage of the tube as a cooling medium.

According to the calcined gypsum treatment system with such an arrangement, a load of the pressurizing or transporting device for inducing the outdoor atmospheric air as the thermal medium fluid, such as a fan or blower, can be relieved by the reduction of the flow rate of the thermal medium fluid through the heat transfer tube moving in the upper zone, whereby a performance or capacity of the pressurizing or transporting device can be decreased, or an electric power consumption of the device can be saved. Further, in a case where the flow rate of the heat exchanger is set to be a value equivalent to a flow rate of the conventional multitubular rotary heat exchanger arranged to uniformly introduce the fluid into all of the tubes, the flow rate of the fluid through the tube in heat transfer contact with the processed matter can be increased to improve the heat transfer efficiency of the heat exchanger. This is practically advantageous.

From yet another aspect, the present invention provides a heating or cooling method for heating or cooling a processed matter with use of a multitubular rotary heat exchanger having a rotatable shell closed at its both end portions by tube plates and a number of heat transfer tubes disposed in an inner space of the shell, wherein a heating or cooling region for heating or cooling the processed matter fed to the inner space is formed in the shell; wherein each end portion of each of said tubes is carried by the tube plate, and the end portion is open on an outside surface of the tube plate or in its vicinity; and wherein the shell, the plates, and the tubes are rotated as a whole to heat or cool the processed matter by heat exchange between the thermal medium fluid in the tubes and the processed matter in the heating or cooling region, comprising:

positioning a stationary surface of a shielding unit in the vicinity of said tube plate outside said heating or cooling region so as to be in close proximity to and in opposition to an end opening of the tube moving in an upper zone of said heating or cooling region, for restricting or limiting a flow rate of said thermal medium fluid introduced into said end opening of the tube moving in the upper zone or the fluid effluent therefrom, and separating said surface apart from the said end opening of the tube moving in a lower zone of said heating or cooling region, for releasing said restriction or limitation of the flow rate of the thermal medium fluid.

Further, the present invention also provides a method for treating calcined gypsum including the heating or cooling method as set forth above, comprising:

using the aforementioned multitubular rotary heat exchanger as an agitation-type cooler for cooling the calcined gypsum;

introducing into the cooling region, the calcined gypsum to be cooled therein; and opening to the atmosphere, the end portion of the heat transfer tube on a thermal medium inflow side of the tube, whereby outdoor atmospheric air is introduced into an intratubular passage of the tube as a cooling medium.

Advantageous Effects of Invention

According to the present invention, the multitubular rotary heat exchanger and the heating or cooling method with use of such a heat exchanger are provided to be capable of a reduction in the flow rate of the thermal medium fluid through the heat transfer tube ineffectively cooling or heating the processed matter, whereby the energy efficiency or thermal efficiency can be improved and the electric power consumption can be saved.

Further, the present invention provides the apparatus and method for treating the calcined gypsum, which are capable of a reduction in the flow rate of the cooling air through the heat transfer tube ineffectively cooling the calcined gypsum, thereby improving the energy efficiency or thermal efficiency and saving the electric power consumption.

BRIEF DESCRIPTION OF THE DRAWINGS

FIG. 1(A) is a side elevational view showing an overall configuration of a calcined gypsum treatment system with a multitubular rotary heat exchanger, FIG. 1(B) is a cross-sectional view of the system taken along a line I-I of FIG. 1(A), and FIG. 1(C) is an elevational view showing a distal end surface of the system.

FIG. 2 is a perspective view showing a positional or structural relationship among cooling tubes, a shell, tube plates, and a calcined gypsum feeding device, wherein the heat exchanger is shown in a condition that shielding units are removed therefrom.

FIG. 3 is a cross-sectional view of a cooler taken along line II-II of FIG. 1, wherein an operating condition of the cooler is illustrated.

FIG. 4(A) and FIG. 4(B) are elevational views illustrating the shielding units which are installed to the tube plate on the side of an end chamber and the tube plate on the side of the outdoor atmosphere, respectively.

FIG. 5(A) is a perspective view showing an internal construction of the cooler in a condition that the shielding units are installed to the tube plates both on the side of the end chamber and on the side of the outdoor atmosphere, and FIG. 5(B) is a perspective view showing a structure of the shielding unit positioned in close proximity to the tube plate on the side of the end chamber.

FIG. 6(A) and FIG. 6(B) are a vertical cross-sectional view and a perspective view showing a structure of the shielding unit positioned in close proximity to the tube plate on a distal end side.

FIG. 7 is a horizontal cross-sectional view conceptually illustrating a mode of operation of the cooler.

FIG. 8 is a vertical cross-sectional view conceptually illustrating the mode of operation of the cooler.

FIG. 9 (A) is an elevational view illustrating a distal end surface of the cooler having the shielding unit with a different structure, and FIG. 9 (B) is a vertical cross-sectional view illustrating a structure of a distal end portion of the cooler as shown in FIG. 9(A).

DESCRIPTION OF EMBODIMENTS

In a preferred embodiment of the present invention, the shielding unit is located in a space on a thermal medium inflow side of the tube plate in close proximity to the end opening of the heat transfer tube on the inflow side, or in a space on a thermal medium outflow side of the tube plate in close proximity to the end opening of the tube on the outflow side. If desired, the shielding units are located in the respective spaces on the inflow or outflow sides of the respective tube plates, each of the shielding units being in close proximity to the corresponding end opening on the inflow or outflow side.

In another preferred embodiment of the present invention, the shielding unit is configured by a sectorial or semi-circular shielding plate, or the unit is an assembly constituted from the sectorial shielding plates connected to each other. The upper zone is a space that opposes to an accumulation of the processed matter deviated on one side of the heating or cooling region under an action of rotation of the shell and which is deviated on a side opposite to the accumulation with respect to a vertical center plane of the shell.

If desired, the heat exchanger is provided with a mounting mechanism for adjustably mounting the shielding unit adjacent to the tube plate in a positionally adjustable manner, whereby the position of the shielding unit (the circumferential position of the unit, the distance between the stationary surface and the tube plate, and so forth) can be readily changed, in relation to a kind of processed matter, a physical property of the processed matter, a material quality of the processed matter, a condition of use of the heat exchanger, and so forth.

Preferably, the shielding unit is a sectorial or semi-circular assembly constituted from the shielding plates integrally connected to each other, and the assembly is provided with a shielding angle adjusting mechanism for changing a center angle of the unit, in such a manner that an overlapping angle of the adjacent shielding plates is adjusted. The group of the tubes to be restricted or limited in a throughflow of the thermal medium fluid can be changed by the adjustment of the center angle of the unit.

Desirably, the shielding unit has an area or size for shielding a number of the end openings of the heat transfer tubes, the number of which is set to be in a range from 20% of the total number of the tubes to 50% thereof, and the flow rate of the thermal medium fluid of the tube reduced by the shielding unit is set to be equal to or less than one-fifth of the flow rate of the fluid of the tube in heat transfer contact with the processed matter. According to a simulation carried out by the present inventor et al., the heat transfer tubes, the number of which is approximately in a range between 20% of the total number of the tubes and 50% thereof, are not in heat transferable contact with the processed matter, and therefore, the thermal medium fluid flowing through such tubes cannot effectively take the cooling or heating action on the processed matter. Thus, the shielding unit covers the end opening of such tubes, so that the flow rate of the fluid flowing therethrough is restricted or limited to be the flow rate enough for merely cooling the atmosphere of the upper zone in the shell.

Preferably, the distance between the shielding unit and the end opening is set to be in a range between one-twentieth of the diameter of the opening and 2.0 times thereof, more preferably, in a range between one-tenth of the diameter of the opening and 1.0 times thereof. For instance, in a case where an inner diameter of each of the heat transfer tube and its end opening is approximately 50 mm, the distance between the shielding unit and the end opening is set to be in a range between 25 mm and 100 mm, preferably, in a range between 5 mm and 50 mm. The distance between the shielding unit and the end opening may be set differently for each of the end openings.

If desired, the system for treating calcined gypsum, which has the multitubular rotary heat exchanger used as the agitation-type cooler for cooling the calcined gypsum, further comprises a moisture supplying device for incorporating moisture into the calcined gypsum. The moisture supplying device introduces a spouting flow or delivery flow of a humid gas containing an amount of water content or steam, into the cooling region. The humid gas is, for example, a high temperature and high humidity gas generated in a calciner for calcination of the calcined gypsum and separated from the calcined gypsum, or steam generated in another process. The gas is introduced into the cooling zone for modification or reforming of the calcined gypsum (conversion of the calcined gypsum to III type anhydrous gypsum, improvement of water solubility of particles of the calcined gypsum in a slurrying step, and so forth).

Embodiment

With reference to the attached drawings, a preferred embodiment of the present invention is described hereinafter.

FIG. 1(A) is a side elevational view showing an overall configuration of a calcined gypsum treatment system provided with a multitubular rotary heat exchanger, FIG. 1(B) is a cross-sectional view of the system taken along a line I-I of FIG. 1(A), and FIG. 1(C) is an elevational view showing a distal end surface of the system.

As shown in FIG. 1(A), the calcined gypsum treatment system is provided with an inner-tube-rotary agitation-type cooler 1 (referred to as "cooler 1" hereinafter). The multitubular rotary heat exchanger according to the present invention is embodied as the cooler 1. The calcined gypsum G is a solid material or solid matter at a high temperature in a powdered or granulated state, which is produced by a calciner (not shown) for solely calcining raw gypsum, such as natural gypsum or chemical gypsum, or mixing and heating (calcining) different kinds of raw gypsum. The calcined gypsum G contains calcium sulfate hemihydrate ($CaSO_4 \cdot 1/2H_2O$) as a principal component, and used as a gypsum-based raw material for producing gypsum boards and so forth.

The cooler 1 comprises a cylindrical shell 3 and a number of cooling tubes (heat transfer tubes) 2 disposed in the shell 3. The tubes 2 constitute an air-cooling type heat exchanger. The cooler 1 is provided with a rotary drive device 5 as schematically illustrated by imaginary lines. The device 5 rotates the shell 3 about the center axis X-X. The cooler 1 is also provided with a screw-feeder type of calcined gypsum supply device 10, which supplies a cooling region D of the cooler 1 with calcined gypsum G.

The device 10 comprises a cylindrical housing 11, a driving device 12 (such as an electric motor), a screw part 14, an inlet section 15, and a calcined gypsum charging port 16. The cylindrical housing 11 extends into the cooling region D. The screw part 14 is connected to a rotary drive shaft 13 of the device 12 in series. The inlet section 15 is configured in the form of a hopper, into which the calcined gypsum G at a relatively high temperature is introduced. The charging port 16 opens to the cooling region D for charging the calcined gypsum G into the area D. A center axis of each of the cylindrical housing 11 and the screw part 14 coincides with the center axis X-X of the shell 3. The port 16 opens on an underside surface of a distal end portion of the cylindrical housing 11. A calcined gypsum feeding conduit 17 is connected to the inlet section 15. The conduit 17 is connected to a calciner for calcining raw gypsum (not shown). The calcined gypsum discharged from the calciner is fed to the screw part 14 through the conduit 17 and the inlet section 15. The rotating screw part 14 extrudes the calcined gypsum G into the cooling region D through the port 16 so that the calcined gypsum G is introduced into the cooling region D, as shown by an arrow in FIG. 1(A). A humid gas feeding port (not shown) is provided in the vicinity of the port 16, through which a spouting flow or delivery flow of a humid gas containing an amount of water content or steam is introduced into the cooling region D. The humid gas feeding port functions as a moisture supplying device for incorporating moisture into the calcined gypsum G. The calcined gypsum G absorbs the water or moisture contained in the humid gas S, whereby the gypsum G is modified to have a composition, components, physical properties, or nature that may result in a reduction of the mixing water for slurrying the calcined gypsum (or prevention of increase of the mixing water therefor). The modification of the calcined gypsum G by the incorporation of moisture into the calcined gypsum G is described in detail in PCT International Publication No. WO2017/135250(A1), which is Patent Literature 4 as set forth above, and therefore, detailed explanation thereof is omitted by referring to this publication.

A center axis X-X of the cooler 1 is inclined at a predetermined angle with respect to a horizontal floor or ground surface J (horizontal surface). The rotary drive device 5 rotates the shell 3 in a direction of an arrows R, at a predetermined rotational speed. The cooling region D in the shell 3 causes the calcined gypsum G to be agitated in the shell 3 while being moved toward a distal end portion 3b. The calcined gypsum G at a relatively high temperature, which is introduced into the shell 3 at a proximal end portion 3a of the shell 3, moves toward the distal end portion 3b, due to the inclination of the shell 3. The calcined gypsum G is discharged through a discharge port 4a of an exhaust and discharge section 4, as the calcined gypsum Ga which has been modified and cooled. The exhaust and discharge section 4 is supported in a stationary condition and fixed in position by a foundation (not shown) on the floor or ground surface J. The shell 3 is rotated relative to the exhaust and discharge section 4.

End portions of the cooling region D are closed by a tube plate 8 on a proximal end side and a tube plate 9 on a distal end side, respectively. Each of the cooling tubes 2 is carried at the end portions by the plates 8, 9, respectively. Each of the cooling tubes 2 extends in parallel with the center axis X-X in the cooling region D. A periphery of each of the plates 8, 9 is integrally connected to the shell 3 to be rotated together with the shell 3. Therefore, the tubes 2 carried by the plates 8, 9 are also rotated together with the shell 3. As described later, the cooler 1 is provided with a shielding units 20 in close proximity to outside surfaces of the plates 8, 9, respectively.

An exhaust port 4b for exhausting an atmospheric gas in the shell 3 is provided at a top portion of the exhaust and discharge section 4. The exhaust port 4b is connected to an exhaust fan (or an exhaust blower) Fb through an exhaust gas passage Fa. A suction pressure of the fan Fb acts on the cooling region D through the passage Fa and the port 4b. Therefore, the atmospheric gas in the cooling region D is exhausted out of the system by the fan Fb. If desired, the passage Fa is provided with a dust removing device Fc (shown by imaginary lines), such as a bag-filter.

FIG. 2 is a perspective view showing the positional or structural relationship among the cooling tubes 2, the shell 3, the tube plates 8, 9, and the calcined gypsum supply device 10, wherein the cooler 1 is illustrated in a condition that the shielding units 20 (FIG. 1(C)) are removed therefrom.

An exhaust manifold 6 is connected to the proximal end portion 3a of the shell 3 and an end chamber 6a is formed on a proximal side of the tube plate 8. The exhaust manifold 6 is supported by a foundation (not shown) on the floor or ground surface J (FIG. 1). Therefore, the exhaust manifold 6 is sustained in a stationary state and is fixed in its position, and the shell 3 is rotated relative to the exhaust manifold 6.

The calcined gypsum supply device 10 extends into the cooling region D through a center part of the end chamber 6a and the tube plate 8. A proximal end portion 2a of each of the cooling tubes 2 extends through the plate 8. An intratubular fluid passage of the tube 2 is open to the chamber 6a on an outside surface of the plate 8. The manifold 6 is connected to an exhaust fan (or an exhaust blower) Eb through an exhaust tube Ea. The suction pressure of the fan Eb acts on the intratubular fluid passage of each of the tubes 2 through the tube Ea and the chamber 6a.

A distal end portion of each of the cooling tubes 2 extends through the tube plate 9. The intratubular fluid passages of the tubes 2 are open to the outdoor atmosphere on an outside surface of the plate 9. Each of the tubes 2 sucks the outdoor air (outside atmospheric air indicated by "Air") at the outside atmospheric temperature through a distal end portion 2b under the suction pressure of the exhaust fan Eb (FIG. 1). As shown by arrows in FIG. 2, the outdoor air introduced into the tubes 2 flows into the end chamber 6a of the exhaust manifold 6 through the tubes 2, and then, the air is exhausted out of the system as an exhaust gas EX under the delivery pressure of the fan Eb (FIG. 1). The outdoor air flowing in the tubes 2 is brought into heat transfer contact with the calcined gypsum G in the cooling region D, via tube walls of the tubes 2. The calcined gypsum G is cooled mainly by thermal conduction between solid matters. That is, the tubes 2 constitute an air-cooled-type heat exchanger with use of the outdoor air as a cooling medium, and the air heated by the heat exchange is exhausted through the manifold 6 out of the system as the exhaust gas EX.

FIG. 3 is a cross-sectional view of the cooler 1 taken along line II-II of FIG. 1. In FIG. 3, a condition of use of the cooler 1 is illustrated. FIG. 4 includes elevational views of the tube plates 8, 9, wherein the shielding units 20 are provided both on the end chamber side of the plate 8 and on the outside of the plate 9. FIG. 4(A) shows the shielding unit 20 installed on the end chamber side of the plate 8, whereas FIG. 4(B) shows the shielding unit 20 installed outside the plate 9.

As shown in FIG. 3, the calcined gypsum G is biased forward as seen in a rotational direction under a rotational force of the shell 3. The calcined gypsum G is accumulated in a state unevenly distributed and deviated on one side (the left side in FIG. 3) with respect to a vertical center plane Y-Y of the shell 3. In general, the calcined gypsum G is fluidized as shown by dashed arrows. The calcined gypsum G is in heat transfer contact with the tube walls of the cooling tubes 2. The calcined gypsum G is cooled by the heat exchange between the cooling medium (outdoor air) flowing in the tubes 2 and the calcined gypsum G, via the tube walls of the tubes 2. From a viewpoint of effective and efficient cooling of the calcined gypsum G with use of the tubes 2, the calcined gypsum G should be properly fluidized. Since the calcined gypsum G is introduced into the cooling region D from a radially center zone of the cooling region D, a volumetric occupation ratio of the calcined gypsum G should be equal to or less than a value ranging from 50% to 70%, wherein the volumetric occupation ratio is a ratio of the volume occupied by the claimed gypsum G, relative to the whole volume of the cooling region D. Usually, the cooler 1 can be operated only under a condition that the volumetric occupation ratio is equal to or less than 50%. For such a reason, there exist an upper zone α where the calcined gypsum G is absent and a lower zone β where the calcined gypsum G is accumulated. The zone α opposes to the zone β. The zone α is deviated on the opposite side of the zone β with respect to the vertical center plane Y-Y (on the right side in FIG. 3). The cooling tube 2 does not take a heat exchange action with the calcined gypsum G, when the tube 2 moves in the zone α of the region D in a direction as shown in arrows R. Therefore, the cooling medium (outdoor air), which flows through the tube 2 during the movement of the tube 2 in the zone α, is raised in its temperature only slightly by heat exchange with the atmospheric gas in the zone α. Most of the effectively usable cold heat (cooling capacity) of the cooling medium (outdoor air) is discharged without being effectively utilized.

According to the present invention, the shielding unit 20, which is an attachment-type or detachable-type device, is mounted on the cooler 1 in a position corresponding to the upper zone α and in close proximity to the outside surface of the tube plate 8 and/or the outside surface of the tube plate 9. The unit 20 may be installed to at least one of the plates 8, 9, and it is not inevitably necessary to install the unit 20 to each of the plates 8, 9. However, in this embodiment, the unit 20 is installed to each of the plates 8, 9. The plates 8, 9 are rotated together with the shell 3 in a direction of the arrow R, but the units 20 are securely fixed to the exhaust and discharge section 4 and the exhaust manifold 6. Therefore, the unit 20 is normally stationary, and the plates 8, 9 are rotated relative to the units 20. The unit 20 is slightly spaced apart from the plates 8, 9 so as not to be in frictional contact with the plates 8, 9. Thus, a gap S is created between the unit 20 and the plate 8, 9, as shown in FIG. 6(A). As described later, a small or minute amount of air stream is induced through the gap S into an opening of the distal end portion 2b and is introduced into the end chamber 6a through an opening of the proximal end portion 2a.

As shown in FIG. 4 and FIG. 1(C), the shielding unit 20 is an assembly of sectorial shielding plates 21, 22, 23 made of metal, or a structure constituted from the plates 21, 22, 23 integrally combined together. A central angle θ1 of each of the plates 21, 22, 23 is set to be, e.g., 120 degrees. A peripheral edge of each of the plates 21, 22, 23 is curved with a curvature equivalent to the curvature of the peripheral edge of the tube plate 8, 9, and is disposed in a position corresponding to the peripheral edge of the plate 8, 9. The plates 21, 22, 23 are partially overlapping with each other and a shielding angle θ2 of the unit 20 as a whole is set to be approximately 180 degrees.

FIG. 5(A) is a perspective view showing an internal structure of the cooler 1 in a condition that the shielding units 20 are installed both on the end chamber side of the tube plate 8 and on the outside of the tube plates 9. FIG. 5(B) is a perspective view showing a structure of the unit 20 positioned adjacent to the plate 8. FIG. 6(A) and FIG. 6(B) are a vertical cross-sectional view and a perspective view showing a structure of the unit 20 adjacent to the plate 9.

The shielding unit 20 positioned adjacent to the tube plate 8 as illustrated in FIG. 5(B) is securely fixed to a wall structure or a peripheral portion of the exhaust manifold 6 by fixing, latching, or anchoring devices, such as welds, latching elements, or anchoring elements (not shown). The shielding unit 20 positioned adjacent to the tube plate 9 as illustrated in FIG. 6 is securely fixed to an annular extension 4c of the exhaust and discharge section 4 by fixing, latching, or anchoring devices, such as welds, latching elements, or anchoring elements (not shown). The shielding plates 21, 22, 23 of the unit 20 are integrally connected to each other by fixing, latching or anchoring devices, such as welds, latching elements, or anchoring elements (not shown).

For instance, in the present embodiment, an inner diameter of the cooling tube 2 is set to be approximately 50 mm, end faces of the distal and proximal end portions 2b, 2a of the tube 2 are substantially flush with the outside surfaces of the plates 8, 9, and dimensions L1, L2 of the gap S (FIG. 6(A)) formed between each of the plates 8, 9 and each of the shielding units 20 is set to be in a range from approximately 10 mm to 100 mm, preferably, in a range from 10 mm to 50 mm.

If desired, the shielding plates 21, 22, 23 may be attached to the exhaust manifold 6 and the annular extension 4c in a positionally adjustable manner. The circumferential positions (angular positions) and the spaced distance (the dimensions L1, L2 of the gap S) of the shielding unit 20, or a range of a shielded area (an angular range and so forth) of the unit 20 may be designed to be adjustable. Further, the plates 21, 22, 23 may be combined with each other by shuttering mechanisms, in such a manner that overlapping dimensions (overlapping angles) of the plates 21, 22, 23 can be readily adjusted to vary the shielding angle θ2 of the unit 20. As the device for adjusting the positions and the overlapping dimensions of the plates 21, 22, 23, any of conventional adjusting mechanisms may be employed.

As shown in FIGS. 5 and 6, the unshielded end portions 2a, 2b of the cooling tube 2 are uncovered to the end chamber 6a and the outdoor atmosphere, respectively, as is conventional, so that the outdoor atmospheric air enters into the opening of the distal end portion 2b and flows into the end chamber 6a through the opening of the proximal end portion 2a as shown by solid arrows. A small or minute amount of atmospheric air enters into the tube 2 in the upper zone α, through the small gap S formed between the shielding unit 20 and the tube plate 9, as shown by dashed arrows in FIG. 6(A), and flows out from the opening of the proximal end portion 2a into the end chamber 6a, through the gap formed between the shielding unit 20 and the tube plate 8 as shown by dashed arrows in FIG. 5(B).

FIGS. 7 and 8 are horizontal and vertical cross-sectional views conceptually showing a mode of operation of the cooler 1.

In FIGS. 7 and 8, the streams of air (cooling medium) passing through the cooling tubes 2 are indicated by thin solid arrows ("Air"), and directions of movements of the calcined gypsum G charged into the inlet section 15 are indicated by thick white arrows (G).

The air at the atmospheric temperature T1, e.g., 20 degrees centigrade (outdoor air at the atmospheric temperature), which is induced into the cooling tubes 2 in the lower zone β under the suction pressure of the exhaust fan Eb, exchanges heat with the calcined gypsum G in the cooling region D, whereby the air is heated up to the temperature T2 (e.g., 60 degrees centigrade). The air thus heated is introduced into the exhaust manifold 6 and is exhausted as the exhaust gas EX out of the system by the exhaust fan Eb. The temperature T3 of the calcined gypsum G charged into the calcined gypsum supply device 10 is, e.g., approximately 150 degrees centigrade. The calcined gypsum G is cooled by heat exchange with the air flowing through the tubes 2. The temperature T4 of the calcined gypsum G discharged through the discharge port 4a is, e.g., approximately 80 degrees centigrade.

If desired, the humid gas (not shown) at a temperature ranging from 100 to 200 degrees centigrade is spouted or delivered through a humid gas feeding port (not shown) into the cooing region D. The calcined gypsum G absorbs the water or moisture contained in the humid gas S, whereby the calcined gypsum G is modified to have a composition, components, physical properties or nature that may result in a reduction of the mixing water for slurrying the calcined gypsum (or prevention of increase of the mixing water therefor). The calcined gypsum thus modified is discharged out of the system through the discharge port 4a.

As shown by dashed arrows in FIGS. 7 and 8, the cooling tubes 2 in the upper zone α, which are shielded by the shielding unit 20, induce the outdoor air through the gap S formed between the unit 20 and the tube plate 9 under the suction pressure of the exhaust fan Eb. The outdoor air flows through the intratubular fluid passages of the tubes 2 and then, flows into the chamber 6a through the gap S between the tube plate 8 and the unit 20, and thereafter, the air is exhausted out of the system as the exhaust gas EX, as set forth above. The air passing through the intratubular fluid passage of the tubes 2 in the area α exchanges heat with the atmospheric gas in the upper zone α to prevent overheating of the atmospheric gas in the upper zone α. The ratio of the flow rate of the air flowing through the tube 2 in the upper zone α relative to the flow rate of the air flowing through the tube 2 in the lower zone β is set to be a value in a range from 1/50, to 1/5, preferably, in a range from 1/100 to 1/10.

FIG. 9 is an elevational view and a partial cross-sectional view of the distal end surface of the cooler 1, in which the shielding unit 20 according to an alternative embodiment is illustrated.

In the embodiment as set forth above, the shielding unit 20 is an assembly of a plurality of sectorial metal plates (the shielding plates 21, 22, 23) integrally connected to each other. However, the shielding unit 20' as shown in FIG. 9 is a bent-processed product formed by bending peripheral edge portions of an approximately semi-circular metal plate. The unit 20' defines the gap S in the form of a thin chamber, which is enclosed by a body of a plate 24, a peripheral edge portion 25, and the tube plate 9. Air streams indicated by dashed arrows are introduced into the gap S through a clearance Sa between the edge portion 25 and the plate 9, and then, introduced into the cooling tubes 2 in the upper zone α. Also, a shielding unit 20' with substantially the same structure is installed to the tube plate 8 on the side of the end chamber 6a, as in the aforementioned embodiment. The air flowing through the tubes 2 is introduced into the end chamber 6a through the gap S and the clearance Sa of the unit 20' on the side of the end chamber 6a, and then, exhausted out of the system as the exhaust gas EX. Preferably, the dimension L3 of the gap S is set to be a value in a range from 10 mm to 100 mm, and the dimension L4 of the clearance Sa is set to be a value in a range from 5 mm to 40 mm.

Although the present invention has been described as to preferred embodiments or examples, the present invention is not limited thereto, but may be carried out in any of various changes or variations without departing from the scope of the invention as defined in the accompanying claims.

For instance, in the aforementioned embodiment, the shielding unit is the assembly of the three sectorial shielding plates, but the shielding unit may be a single plate, an assembly of two plates, or an assembly of four or more plates.

Further, a lot of the end openings are shielded by a single shielding unit in the embodiment as set forth above, but the shielding unit may be divided into a plurality of shielding units, each shielding a group of the end openings.

Also, the shielding unit is configured in the form of a plate or chamber in the embodiment as set forth above, but the shielding unit may be configured by hollow elements, perforated elements or plates, or the like. Further, so far as the rotation of the tube plate relative to the shielding unit is ensured, the clearance or gap between the tube plate and the shielding unit may be substantially eliminated, or the clearance or gap may be closed by a resiliently or elastically deformable material.

Moreover, the heat exchanger according to the aforementioned embodiment is embodied as the cooler for cooling the processed matter with use of the outdoor atmospheric air (cooling medium), but the heat exchanger may be embodied as a cooler, heater, and so forth which acts to cool or heat the processed matter with use of air or gas controlled at a specific temperature as the thermal medium fluid.

Furthermore, the heat exchanger according to the aforementioned embodiment is provided with the end chamber formed on the proximal side and the distal end portion opened to the atmosphere, whereby the thermal medium fluid is introduced from the distal side to the proximal side. However, the end chamber may be formed at each of the proximal and distal end portions, and the thermal medium fluid may be introduced from the proximal side to the distal side.

INDUSTRIAL APPLICABILITY

The present invention can be applied to a multitubular rotary heat exchanger and a heating or cooling method with use of such a heat exchanger. In particular, the present invention is applicable to such a heat exchanger and method for heating or cooling a processed matter, by rotating a shell, tube plates, and heat transfer tubes as a whole and carrying out heat exchange between the processed matter and thermal medium fluid in the tubes. For instance, the multitubular rotary heat exchanger according to the present invention is used as an agitation-type cooling device constituting a system for treating calcined gypsum.

According to the present invention, it is possible to reduce or restrict the flow rate of the thermal medium fluid flowing through the heat transfer tube which cannot effectively cool or heat the processed matter, thereby improving the energy efficiency or thermal efficiency, saving the electric power consumption, and so forth. Therefore, a practical advantage of the present invention is remarkable.

LIST OF REFERENCE SIGNS 1 agitation-type cooler (multitubular rotary heat exchanger)
2 cooling tube (heat transfer tube)
2a proximal end portion
2b distal end portion
3 cylindrical shell
3a proximal end portion
3b distal end portion
exhaust and discharge section
4a discharge port
4b exhaust port
4c annular extension
5 rotary drive device
6 exhaust manifold
6a end chamber
8, 9 tube plate
10 calcined gypsum supply device
11 cylindrical housing
14 screw part
16 calcined gypsum charging port
20, 20' shielding unit
21, 22, 23 shielding plate
30 stationary surface
D cooling region
G calcined gypsum (before cooled)
Ga calcined gypsum (after cooled)
S gap
L1-L4 dimension
X-X center axis
Y-Y vertical center plane
α upper zone
β lower zone
θ1 central angle
θ2 shielding angle

The invention claimed is:

1. A multitubular rotary heat exchanger having a rotatable shell, tube plates closing both end portions of the shell, and a number of heat transfer tubes disposed in an inner space of the shell, wherein a heating or cooling region for heating or cooling a processed matter introduced into the inner space is formed in the shell, each end portion of each of said tubes is carried by a corresponding one of the tube plates, and each end portion of the tubes is open on an outside surface of the corresponding one of the tube plates or in its vicinity, and wherein the shell, the tube plates, and the tubes are rotated as a whole to heat or cool the processed matter by heat exchange between a thermal medium fluid in the tubes and the processed matter in the heating or cooling region, comprising:

a stationary shielding unit for transiently reducing a flow rate of the thermal medium fluid flowing through said heat transfer tubes while the tubes move in an upper zone of said heating or cooling region, wherein said shielding unit is positioned in the vicinity of at least one of said tube plates outside said heating or cooling region and is provided with a stationary surface which restricts or limits a flow of said thermal medium fluid induced into an end opening of each of the tubes or the fluid effluent therefrom, and wherein said stationary surface is in close proximity to and in opposition to said end opening of each of the tubes moving in said upper zone and is separated apart from the end opening of each of the tubes moving in a lower zone of said heating or cooling region.

2. The heat exchanger as defined in claim 1, wherein said shielding unit is located in a space on a thermal medium inflow side of said at least one of said tube plates in close proximity to said end opening of each of the heat transfer tubes on the inflow side, and/or the shielding unit is located in a space on a thermal medium outflow side of said at least one of said tube plates in close proximity to the end opening of each of the heat transfer tubes on the outflow side.

3. The heat exchanger as defined in claim 1, wherein said shielding unit is configured by a sectorial or semi-circular shielding plate, or the shielding unit is an assembly of sectorial shielding plates connected to each other, and wherein said upper zone is a space which opposes to an accumulation of the processed matter deviated on one side of said heating or cooling region under an action of rotation of said shell and which is deviated on a side opposite to the accumulation with respect to a vertical center plane of the shell.

4. The heat exchanger as defined in claim 1, further comprising a mounting mechanism for mounting said shielding unit in the vicinity of said at least one of said tube plates in a positionally adjustable manner.

5. The heat exchanger as defined in claim 1, wherein said shielding unit is a sectorial or semi-circular assembly of shielding plates integrally connected to each other, and wherein the assembly is provided with a shielding angle adjusting mechanism for changing a center angle of the shielding unit by adjusting an overlapping angle of adjacent shielding plates.

6. The heat exchanger as defined in claim 1, wherein said shielding unit has an area or size for shielding a number of the end openings of the heat transfer tubes, the number of which is set to be in a range from 20% of the total number of the heat transfer tubes to 50% thereof.

7. The heat exchanger as defined in claim 1, wherein a flow rate of the thermal medium fluid of each of said tubes reduced by said shielding unit, is set to be equal to or smaller than one-fifth of the flow rate of the fluid of each of the tubes in heat transfer contact with the processed matter.

8. The heat exchanger as defined in claim 1, wherein a distance between said shielding unit and said end opening of each of said tubes is set to be in a range between one-tenth of a diameter of the end opening and 1.0 times thereof.

9. A system for treating calcined gypsum comprising said heat exchanger as defined in claim 1, wherein the heat exchanger is used as an agitation-type cooler for cooling the calcined gypsum, he cooler has a region for cooling the calcined gypsum in said heating or cooling region, and said tubes are open to atmosphere at the end portion of each of the tubes on a thermal medium inflow side, thereby permitting outdoor atmospheric air to flow through an intratubular fluid passage of the tubes as a cooling medium.

10. The system as defined in claim 9 further comprising a moisture supplying device for incorporating moisture into the calcined gypsum, wherein the moisture supplying device is provided with a humid gas supply port which introduces a spouting flow or delivery flow of a humid gas containing an amount of water content or steam, into said heating and cooling region.

11. A heating or cooling method for heating or cooling a processed matter with use of a multitubular rotary heat exchanger having a rotatable shell closed at both end portions by tube plates and a number of heat transfer tubes disposed in an inner space of the shell, wherein a heating or cooling region for heating or cooling the processed matter fed to the inner space is formed in the shell; wherein each end portion of each of said tubes is carried by the tube plates, and each end portion is open on an outside surface of the tube plates or in its vicinity; and wherein the shell, the tube plates, and the tubes are rotated as a whole to heat or cool the processed matter by heat exchange between a thermal medium fluid in the tubes and the processed matter in the heating or cooling region, comprising:
  positioning a stationary surface of a shielding unit in the vicinity of at least one of said tube plates outside said heating or cooling region so as to be in close proximity to and in opposition to an end opening of each of the tubes moving in an upper zone of said heating or cooling region, for restricting or limiting a flow rate of said thermal medium fluid introduced into said end opening of each of the tubes moving in the upper zone or the fluid effluent therefrom, and
  separating said surface apart from said end opening of each of the tubes moving in a lower zone of said heating or cooling region, for releasing said restriction or limitation of the flow rate of the thermal medium fluid.

12. The method as defined in claim 11, wherein said shielding unit is located in a space on a thermal medium inflow side of said at least one of said tube plates in close proximity to the end opening of each of the heat transfer tubes on the inflow side, and/or the shielding unit is located in a space on a thermal medium outflow side of said at least one of said tube plates in close proximity to the end opening of each of the tubes on the outflow side.

13. The method as defined in claim 11, wherein said upper zone is a space which opposes to an accumulation of the processed matter deviated on one side of said heating or cooling region under an action of rotation of said shell and which is deviated on a side opposite to the accumulation, and wherein said shielding unit is configured by a sectorial or semi-circular shielding plate, or the shielding unit is an assembly of sectorial shielding plates connected to each other.

14. The method as defined in claim 11, wherein said shielding unit is mounted in the vicinity of said at least one of said tube plates in a positionally adjustable manner.

15. The method as defined in claim 11, wherein said shielding unit is an assembly constituted from sectorial shielding plates integrally connected to each other, and wherein the assembly is provided with a shielding angle adjusting mechanism for changing a center angle of the shielding unit by adjusting an overlapping angle of adjacent shielding plates.

16. The method as defined in claim 11, wherein said shielding unit shields a number of the end openings of the heat transfer tubes, the number of which is set to be in a range from 20% of the total number of the heat transfer tubes to 50% thereof.

17. The method as defined in claim 11, wherein the flow rate of the thermal medium fluid of each of said tubes moving in said upper zone is reduced by said shielding unit, down to a value equal to or small than one-fifth of the flow rate of the fluid of each of the tubes in heat transfer contact with the processed matter.

18. The method as defined in claim 11, wherein a distance between said shielding unit and said end opening is set to be in a range between one-tenth of a diameter of the end opening and 1.0 times thereof.

19. A method for treating calcined gypsum including the heating or cooling method as defined in claim 11, comprising:

using said multitubular rotary heat exchanger as an agitation-type cooler for cooling the calcined gypsum;

introducing into said heating and cooling region, the calcined gypsum to be cooled therein; and opening to the atmosphere, the end portion of each of said heat transfer tubes on a thermal medium inflow side of the tubes, whereby outdoor atmospheric air is introduced into an intratubular passage of each of the tubes as a cooling medium.

20. The method as defined in claim 19, wherein a spouting flow or delivery flow of a humid gas containing an amount of water content or steam is introduced into said heating and cooling region with use of a moisture supplying device for incorporating moisture into the calcined gypsum.

* * * * *

UNITED STATES PATENT AND TRADEMARK OFFICE
CERTIFICATE OF CORRECTION

PATENT NO. : 11,300,357 B2
APPLICATION NO. : 16/981407
DATED : April 12, 2022
INVENTOR(S) : Tomonori Yoshida et al.

Page 1 of 1

It is certified that error appears in the above-identified patent and that said Letters Patent is hereby corrected as shown below:

In the Claims

Column 15, Line 49:
In Claim 9, delete "he" and insert --the--.

Signed and Sealed this
Fourteenth Day of June, 2022

Katherine Kelly Vidal
*Director of the United States Patent and Trademark Office*